United States Patent
Numazaki et al.

(10) Patent No.: US 12,287,038 B2
(45) Date of Patent: Apr. 29, 2025

(54) PRESSURE REDUCTION VALVE

(71) Applicant: JTEKT CORPORATION, Kariya (JP)

(72) Inventors: Kazushi Numazaki, Toyota (JP); Tetsuya Kaneko, Okazaki (JP); Akira Nakano, Okazaki (JP); Kazuhiro Takabayashi, Okazaki (JP); Kazuo Haneda, Toyota (JP); Yuya Kihara, Nishio (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/256,244

(22) PCT Filed: Jun. 22, 2021

(86) PCT No.: PCT/JP2021/023588
§ 371 (c)(1),
(2) Date: Jun. 7, 2023

(87) PCT Pub. No.: WO2022/123813
PCT Pub. Date: Jun. 16, 2022

(65) Prior Publication Data
US 2024/0019038 A1   Jan. 18, 2024

(30) Foreign Application Priority Data

Dec. 11, 2020   (JP) ................. 2020-205704

(51) Int. Cl.
*F16K 17/28*   (2006.01)
*G05D 16/10*   (2006.01)

(52) U.S. Cl.
CPC .......... *F16K 17/28* (2013.01); *F16K 2200/40* (2021.08); *F17C 2205/0338* (2013.01); *G05D 16/103* (2013.01); *Y10T 137/7808* (2015.04)

(58) Field of Classification Search
CPC .......... F17C 2205/0338; G05D 16/103; Y10T 137/7808
See application file for complete search history.

(56) References Cited

U.S. PATENT DOCUMENTS 3,685,533 A * 8/1972 Krechel ................. F16K 17/10
                                               137/115.06
3,930,519 A * 1/1976 Byrd ..................... F16K 31/365
                                               137/505.25
(Continued)

FOREIGN PATENT DOCUMENTS

| JP | 2006-250239 A | 9/2006 |
| JP | 2016-184260 A | 10/2016 |
| JP | 2017-126269 A | 7/2017 |

OTHER PUBLICATIONS

International Search Report issued Sep. 7, 2021 in PCT/JP2021/023588 filed on Jun. 22, 2021 4 pages.

*Primary Examiner* — Robert K Arundale
(74) *Attorney, Agent, or Firm* — Oblon, McClelland, Maier & Neustadt, L.L.P.

(57) ABSTRACT

A pressure reduction valve includes a body including a gas passage, a valve seat provided in the gas passage, and a valve member provided on a downstream side of the valve seat in the gas passage. The gas passage includes a primary-side passage section located on an upstream side of the valve member, and a secondary-side passage section located on a downstream side of the valve member. The primary-side passage section includes a pressure chamber, which is a space formed between the valve member and the valve seat. The valve member includes a valve member passage that connects the pressure chamber to the secondary-side passage section, and an auxiliary passage configured to assist gas that flows into the pressure chamber through a clearance between (Continued)

the valve member and the valve seat to flow out to the secondary-side passage section.

6 Claims, 5 Drawing Sheets

(56) References Cited

U.S. PATENT DOCUMENTS

| | | | |
|---|---|---|---|
| 2006/0124174 A1* | 6/2006 | Flynn | F16K 17/30 137/509 |
| 2009/0065727 A1 | 3/2009 | Nomichi et al. | |
| 2020/0089260 A1 | 3/2020 | Jung | |

* cited by examiner

PRESSURE REDUCTION VALVE

TECHNICAL FIELD

The present disclosure relates to a pressure reduction valve.

BACKGROUND ART

Patent Literature 1 discloses one example of a pressure reduction valve that reduces the pressure of gas supplied from a primary port and delivers the gas having a reduced pressure to a secondary port. The pressure reduction valve includes a body, a valve seat, a valve member, and an urging member. The body includes a passage that connects the primary port and the secondary port to each other. The valve seat is provided in the passage. The valve member is allowed to approach and move away from the valve seat. The urging member urges the valve member in a direction away from the valve seat. The passage includes a primary-side passage section on a side of the valve member on which the primary port is located and a secondary-side passage section on a side of the valve member on which the secondary port is located. The valve member moves in accordance with a difference between the pressure in the primary-side passage section and the pressure in the secondary-side passage section, as well as the urging force of the urging member. A secondary pressure is adjusted by changing the opening degree of the pressure reduction valve in accordance with the position of the valve member.

CITATION LIST

Patent Literature

Patent Literature 1: Japanese Laid-Open Patent Publication No. 2017-126269

SUMMARY OF INVENTION

Technical Problem

In the pressure reduction valve of Patent Literature 1, there are concerns as follows. For example, when the pressure reduction valve is open, the pressure in the primary-side passage section abruptly increases as gas abruptly enters from the primary port. This increases the difference between the pressure in the primary-side passage section and the pressure in the secondary-side passage section, which may delay the closing action of the valve member. Such a delay in the closing action can cause the secondary pressure to exceed the value of a set pressure.

Accordingly, it is an objective of the present disclosure to provide a pressure reduction valve capable of properly adjusting the pressure of gas.

Solution to Problem

A pressure reduction valve according to one aspect of the present disclosure includes a body including a gas passage, a valve seat provided in the gas passage, and a valve member provided on a downstream side of the valve seat in the gas passage. The gas passage includes a primary-side passage section located on an upstream side of the valve member, and a secondary-side passage section located on a downstream side of the valve member. The primary-side passage section includes a pressure chamber. The pressure chamber is a space formed between the valve member and the valve seat. The valve member is configured to be constantly urged in a direction away from the valve seat and to open and close the valve seat in accordance with a difference between a pressure in the primary-side passage section and a pressure in the secondary-side passage section. The valve member further includes a valve member passage that connects the pressure chamber to the secondary-side passage section, and an auxiliary passage configured to assist gas that flows into the pressure chamber through a clearance between the valve member and the valve seat to flow out to the secondary-side passage section.

A pressure reduction valve according to another aspect of the present disclosure includes a body including a gas passage, a valve seat provided in the gas passage, and a valve member provided on a downstream side of the valve seat in the gas passage. The gas passage includes a primary-side passage section located on an upstream side of the valve member, and a secondary-side passage section located on a downstream side of the valve member. The primary-side passage section includes a pressure chamber. The pressure chamber is a space formed between the valve member and the valve seat. The valve member is configured to be constantly urged in a direction away from the valve seat and to open and close the valve seat in accordance with a difference between a pressure in the primary-side passage section and a pressure in the secondary-side passage section. The valve member further includes a valve member passage that connects the pressure chamber to the secondary-side passage section. The pressure reduction valve further includes a constriction configured to reduce a flow rate of the gas flowing into the pressure chamber through the clearance between the valve member and the valve seat.

DESCRIPTION OF EMBODIMENTS

First Embodiment

A pressure reduction valve according to a first embodiment will be described below.

Figure 1:
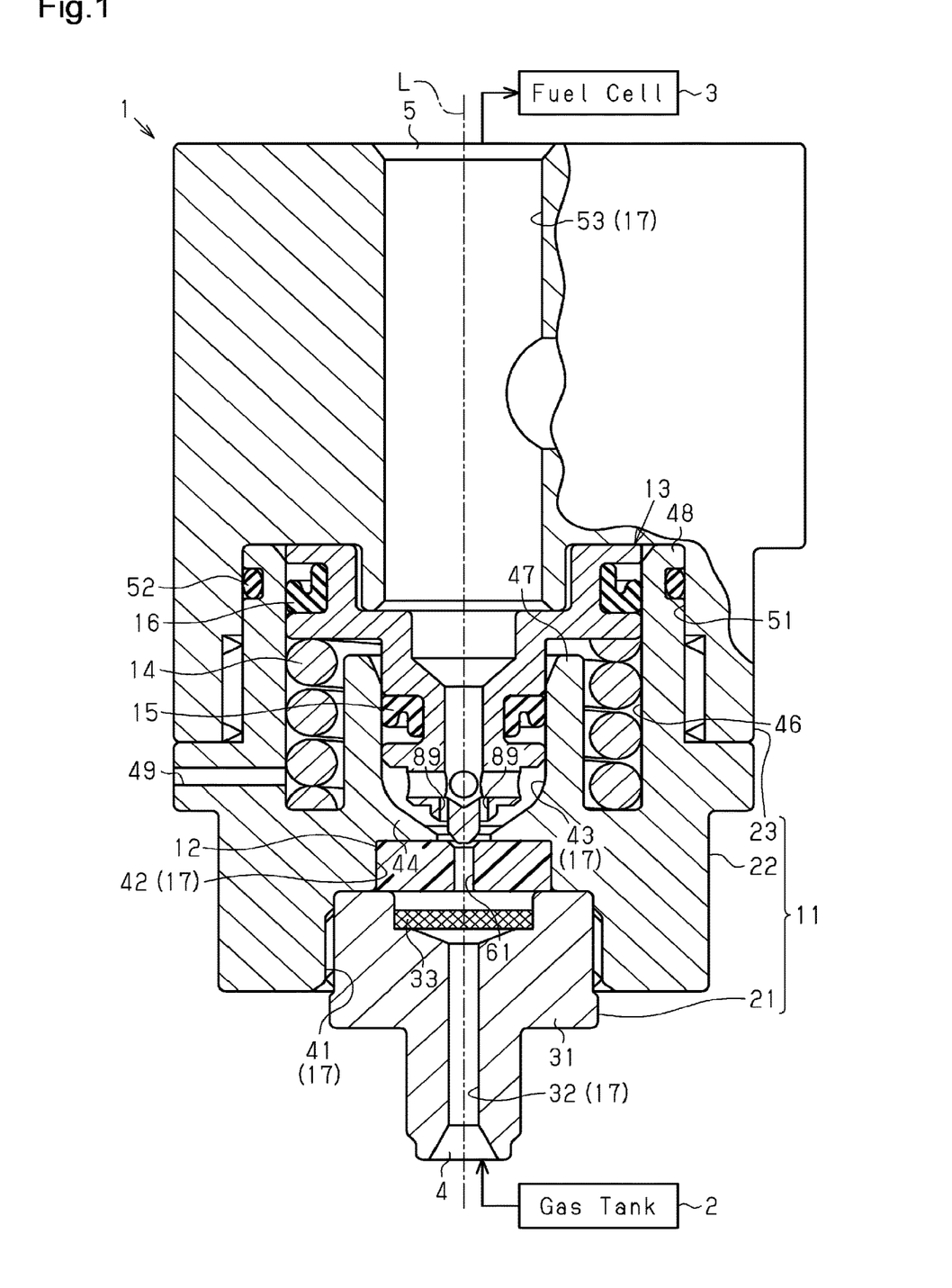
FIG. 1 is a cross-sectional view of a pressure reduction valve according to a first embodiment taken along an axis thereof.

As shown in FIG. 1, for example, a pressure reduction valve 1 is provided in a fluid circuit that connects a gas tank 2 for hydrogen gas and a fuel cell 3 mounted on a fuel cell electric vehicle. The pressure reduction valve 1 reduces the pressure of hydrogen gas supplied from the gas tank 2 via a primary port 4 to a pressure lower than or equal to a preset pressure, and supplies the gas having the reduced pressure to the fuel cell 3 via a secondary port 5. A primary pressure, which is the pressure of the hydrogen gas supplied from the primary port 4 is, for example, about 87.5 MPa. The preset pressure is a target value of a secondary pressure, which is the pressure reduced by the pressure reduction valve 1. The preset pressure is, for example, about 1.2 MPa.

The pressure reduction valve 1 includes a body 11, a valve seat 12, a valve member 13, an urging member 14, a first seal member 15, and a second seal member 16.

The body 11 includes a gas passage 17, which connects the primary port 4 and the secondary port 5 to each other. High-pressure gas flows through the gas passage 17. In the following description, an "upstream side" and a "downstream side" are defined based on the flow direction of the hydrogen gas in the gas passage 17. The valve seat 12 is disposed in the gas passage 17. The valve member 13 is disposed on the downstream side of the valve seat 12 in the gas passage 17. The urging member 14 urges the valve member 13 in a valve opening direction to separate the valve member 13 from the valve seat 12. The first seal member 15 and the second seal member 16 are attached to the outer circumferential surface of the valve member 13. The valve member 13 is brought into contact with and separated from the valve seat 12 in accordance with the differential pressure between the primary pressure and the secondary pressure and the urging force of the urging member 14. As a result of the change in the opening degree of the pressure reduction valve 1 in accordance with the position of the valve member 13, the secondary pressure is adjusted to a pressure lower than or equal to the preset value.

The body 11 includes a joint member 21, a first housing member 22, and a second housing member 23. The joint member 21, the first housing member 22, and the second housing member 23 are made of metal. The joint member 21, the first housing member 22, and the second housing member 23 are arranged in that order from the upstream side in the flow direction of the hydrogen gas. The body 11 is assembled by connecting these members 21, 22, 23 together. In the assembled body 11, the joint member 21, the first housing member 22, and the second housing member 23 are disposed on a common axis L.

The joint member 21 has a generally columnar shape with a step. The joint member 21 includes a large diameter portion 31 and an external thread on the outer circumferential surface of the large diameter portion 31. The joint member 21 includes a joint passage 32, which is a part of the gas passage 17. The joint passage 32 extends linearly along the axis L, and opens at the opposite ends of the joint member 21. An opening on the upstream side of the joint passage 32 functions as the primary port 4. The joint member 21 includes a filter 33. The filter 33 is provided at an opening on the downstream side of the joint passage 32.

The first housing member 22 has a generally columnar shape. The outer diameter of the first housing member 22 is larger than the outer diameter of the joint member 21.

The first housing member 22 includes a first attachment hole 41 and a second attachment hole 42, which are parts of the gas passage 17. The first attachment hole 41 and the second attachment hole 42 are circular holes. The first attachment hole 41 opens in an end face on the upstream side of the first housing member 22. The second attachment hole 42 is continuous with the downstream side of the first attachment hole 41. The first attachment hole 41 and the second attachment hole 42 are provided on the same axis L. The first attachment hole 41 includes an internal thread on the inner circumferential surface. The joint member 21 is connected to the first housing member 22 by fastening the large diameter portion 31 to the first attachment hole 41. The inner diameter of the second attachment hole 42 is smaller than the inner diameter of the first attachment hole 41. The valve seat 12 is attached to the second attachment hole 42. That is, the valve seat 12 is provided in the gas passage 17.

The first housing member 22 includes an accommodation hole 43, which is a part of the gas passage 17. The accommodation hole 43 is substantially circular. The accommodation hole 43 is connected to the second attachment hole 42 and opens in an end face on the downstream side of the first housing member 22. The accommodation hole 43 is provided on the axis L. The first housing member 22 includes a partition wall 44, which separates the accommodation hole 43 and the second attachment hole 42 from each other. The partition wall 44 has an annular shape when viewed from the direction along the axis L. The inner diameter of the partition wall 44 gradually decreases toward the upstream side. The accommodation hole 43 accommodates a part of the valve member 13. The valve member 13 is provided on the downstream side of the valve seat 12 in the gas passage 17.

The first housing member 22 includes an annular installation groove 46. The installation groove 46 is located around the accommodation hole 43. The installation groove 46 is open on the downstream side of the first housing member 22, similarly to the accommodation hole 43. The installation groove 46 is provided as a clearance between a cylindrical inner wall 47 and a cylindrical outer wall 48 provided in the first housing member 22. The inner wall 47 defines an inner contour of the installation groove 46. The outer wall 48 defines an outer contour of the installation groove 46. The outer wall 48 protrudes further downstream than the inner wall 47. The outer circumferential surface of the outer wall 48 forms a part of the outer circumferential surface of the first housing member 22. The outer wall 48 includes an external thread on the outer circumferential surface. The external thread is provided at a position corresponding to the installation groove 46. The first housing member 22 includes a connection passage 49, which connects the inside of the installation groove 46 and the outside of the body 11 to each other.

The second housing member 23 has a generally columnar shape. The outer diameter of the second housing member 23 is slightly larger than the outer diameter of the first housing member 22. The second housing member 23 includes a coupling hole 51. The coupling hole 51 opens in an end face on the upstream side of the second housing member 23. The coupling hole 51 is a circular hole. The coupling hole 51 includes an internal thread on the inner circumferential surface. The internal thread is located close to the open end of the coupling hole 51. As the outer wall 48 is fastened by being inserted into the coupling hole 51, the first housing member 22 is coupled to the second housing member 23. A third seal member 52 such as an O-ring is attached to the outer circumferential surface of the outer wall 48.

Further, the second housing member 23 includes a housing passage 53, which is a part of the gas passage 17. The housing passage 53 extends linearly along the axis L. The housing passage 53 has an opening on the upstream side in the bottom surface of the coupling hole 51 and an opening on the downstream side in the end face on the downstream side of the second housing member 23. The downstream opening of the housing passage 53 functions as the secondary port 5.

The valve seat 12 is made of plastic. The valve seat 12 has an annular shape. The valve seat 12 is disposed in the second attachment hole 42 of the first housing member 22. The valve seat 12 is pressed against the bottom surface of the second attachment hole 42 by the joint member 21 attached to the first attachment hole 41. The valve seat 12 includes a valve hole 61. The valve hole 61 extends linearly along the axis L and opens at the opposite end faces of the valve seat 12 in the direction along the axis L. In a downstream region of the valve hole 61, the inner circumferential surface of the valve hole 61 is inclined so that the inner diameter increases toward the downstream side.

Figure 2:
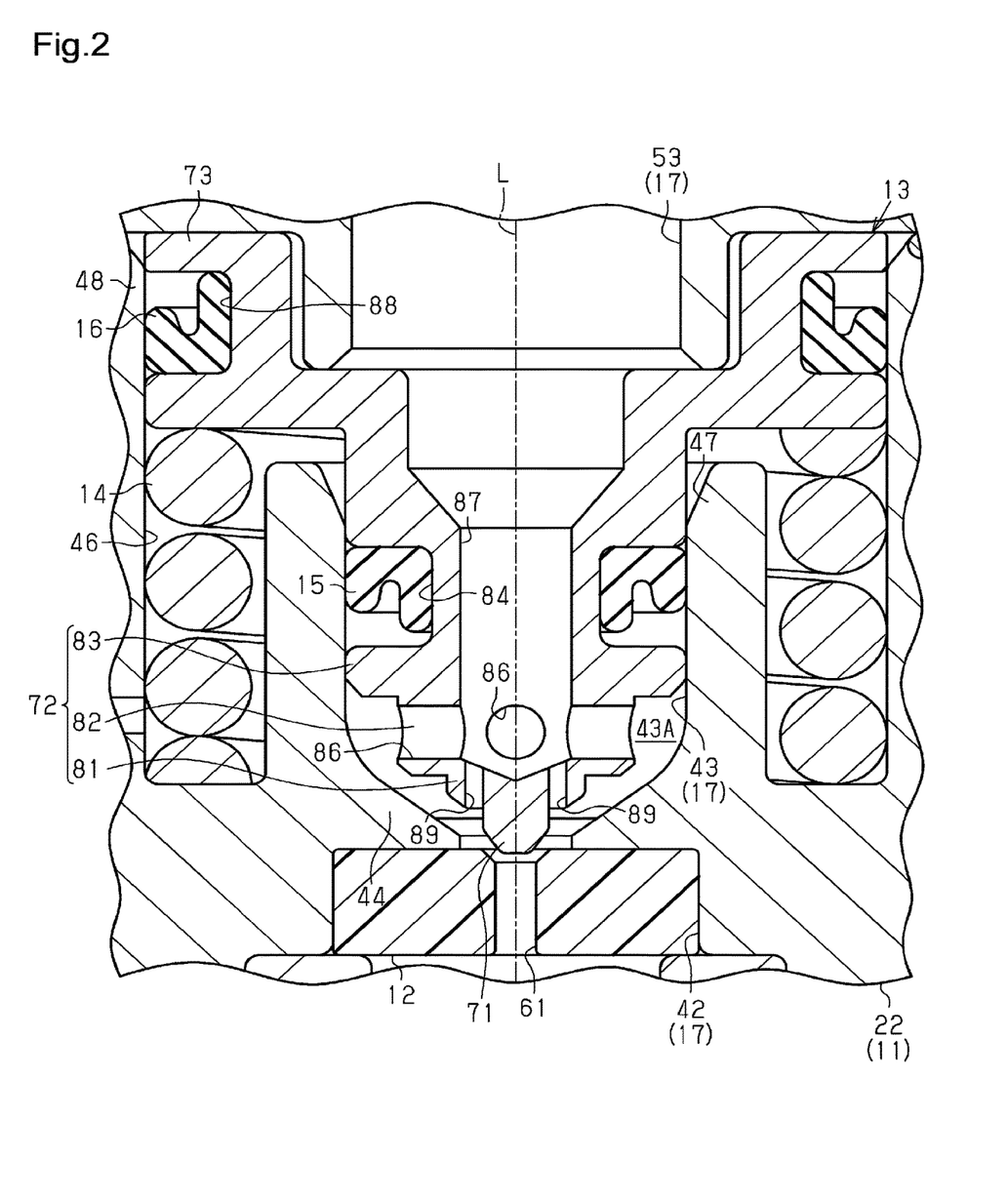
FIG. 2 is an enlarged cross-sectional view of the pressure reduction valve shown in FIG. 1, showing a part including a valve member and a valve seat.

The valve member 13 is made of metal. As shown in FIG. 2, the valve member 13 includes a head 71, a main portion 72, and a pressure receiving portion 73. The head 71, the main portion 72, and the pressure receiving portion 73 are integrally formed in that order from the upstream side. The head 71 and the main portion 72 are accommodated in the accommodation hole 43 of the first housing member 22. The pressure receiving portion 73 protrudes from the inner wall 47 toward the downstream side and is accommodated inside the outer wall 48. The valve member 13 is movable along the axis L inside the body 11. The valve member 13 is allowed to approach and move away from the valve seat 12.

The head 71 has a generally columnar shape. The head 71 has a tapered shape that tapers toward the tip, that is, toward the upstream side. The tapered shape of the head 71 is inclined so as to correspond to the inclination of the downstream region of the valve hole 61.

The main portion 72 has a generally columnar shape with a step. The main portion 72 includes a distal end portion 81, a middle portion 82, and a proximal end portion 83. The distal end portion 81, the middle portion 82, and the proximal end portion 83 are integrally formed in that order from the upstream side. The head 71 is provided on the end face on the upstream side of the distal end portion 81. The outer diameter of the main portion 72 increases in the order of the distal end portion 81, the middle portion 82, and the proximal end portion 83. The proximal end portion 83 includes a first attachment groove 84 in the outer circumferential surface. The first attachment groove 84 is provided in an annular shape extending over the entire circumference of the proximal end portion 83.

The outer diameter of the distal end portion 81 is smaller than the inner diameter of the partition wall 44 of the first housing member 22. The clearance between the distal end portion 81 and the partition wall 44 functions as a part of the gas passage 17. The outer diameter of the middle portion 82 is larger than the outer diameter of the distal end portion 81. The outer diameter of the proximal end portion 83 is slightly smaller than the inner diameter of the accommodation hole 43. The outer circumferential surface of the proximal end portion 83 is slidable on the inner circumferential surface of the accommodation hole 43.

The main portion 72 includes multiple (for example, four) transverse holes 86 and one longitudinal hole 87. Each transverse hole 86 extends linearly along a direction orthogonal to the axis L. Each transverse hole 86 opens in the outer circumferential surface of the middle portion 82. The transverse holes 86 are provided at equal angular intervals in the circumferential direction of the main portion 72. The longitudinal hole 87 extends linearly along the axis L. The longitudinal hole 87 opens to an end face of the main portion 72 on the side opposite to the head 71. The end on the downstream side of the longitudinal hole 87 opens on the downstream side of the valve member 13 in the gas passage 17. The end on the upstream side of the longitudinal hole 87 is connected to each of the plurality of the transverse holes 86. The transverse holes 86 and the longitudinal hole 87 form a valve member passage.

The pressure receiving portion 73 has a generally annular shape with a step. The pressure receiving portion 73 extends radially outward from an end on the downstream side of the main portion 72. The outer diameter of the pressure receiving portion 73 is slightly smaller than the inner diameter of the outer wall 48 of the first housing member 22. The outer circumferential surface of the pressure receiving portion 73 is slidable on the inner circumferential surface of the outer wall 48. The thickness of the pressure receiving portion 73 in the direction along the axis L is greater at a radially outer portion than at a radially inner portion. The pressure receiving portion 73 includes a second attachment groove 88 in the outer circumferential surface. The second attachment groove 88 is provided in an annular shape extending over the entire circumference of the pressure receiving portion 73.

For example, a compression coil spring is employed as the urging member 14. The urging member 14 is accommodated in the installation groove 46. In the installation groove 46, the urging member 14 is compressed along the axis L between the bottom surface of the installation groove 46 and the pressure receiving portion 73 of the valve member 13. The urging member 14 urges the valve member 13 in a valve opening direction away from the valve seat 12, that is, toward the downstream side in the flow direction of the hydrogen gas.

Lip seals are employed as the first seal member 15 and the second seal member 16. The first seal member 15 is attached to the first attachment groove 84, and the second seal member 16 is attached to the second attachment groove 88. The first seal member 15 provides a seal between the outer circumferential surface of the main portion 72 and the inner circumferential surface of the accommodation hole 43. The second seal member 16 provides a seal between the outer circumferential surface of the pressure receiving portion 73 and the inner circumferential surface of the outer wall 48. This configuration prevents the hydrogen gas having a reduced pressure from being discharged to the outside through the installation groove 46 and the connection passage 49.

Next, operation of the pressure reduction valve 1 will be described.

In an initial state before high-pressure hydrogen gas is supplied from the primary port 4, the valve member 13 is maintained on the downstream side by the urging force of the urging member 14. That is, the pressure reduction valve 1 is maintained in an open state, in which the valve member 13 is separated from the valve seat 12.

The hydrogen gas of the primary pressure supplied from the primary port 4 passes through the joint passage 32, which is the gas passage 17, and flows into the accommodation hole 43 via the clearance between the valve hole 61 and the head 71 of the valve member 13. When the hydrogen gas passes through the clearance between the valve hole 61 and the head 71, the pressure of the hydrogen gas is reduced in accordance with the size of the clearance. The hydrogen gas having the reduced pressure flows into the housing passage 53, which is the gas passage 17, via the transverse holes 86 and the longitudinal hole 87, and is delivered from the secondary port 5. As the hydrogen gas flowing in through the valve hole 61 increases in this way, the secondary pressure increases.

The valve member 13 is urged in the valve-opening direction, which is the downstream side, by the urging force of the urging member 14 and an urging force that corresponds to the primary pressure applied to the head 71 via the valve hole 61. The valve member 13 is also urged in the valve closing direction, which is the upstream side, mainly by an urging force that corresponds to the secondary pressure applied to the pressure receiving portion 73. The valve member 13 moves depending on the relative magnitude of the urging forces directed toward the upstream side and those directed toward the downstream side.

The valve member 13 approaches the valve seat 12 as the secondary pressure increases, and is seated on the valve seat 12 when the secondary pressure reaches the preset pressure. That is, the pressure reduction valve 1 is closed.

Thereafter, when the secondary pressure decreases due to consumption of hydrogen gas in the fuel cell 3, the valve member 13 moves toward the downstream side in accordance with the decrease in the secondary pressure. When the pressure reduction valve 1 is opened again, hydrogen gas flows in from the primary port 4. As the valve member 13 moves in response to the differential pressure between the primary pressure and secondary pressure, hydrogen gas adjusted to the preset pressure is supplied from the pressure reduction valve 1 to the fuel cell 3.

The upstream side of the valve member 13 in the gas passage 17, that is, a side of the valve member 13 on which the primary port 4 is provided is referred to as a primary side, and a downstream side of the valve member 13 in the gas passage 17, that is, a side of the valve member 13 on which the secondary port 5 is provided is referred to as a secondary side. The gas passage 17 includes a primary-side passage section located on the upstream side of the valve member 13 and a secondary-side passage section located on the downstream side of the valve member 13. In addition, a space on the primary side with respect to the proximal end portion 83 in the accommodation hole 43 is referred to as a pressure chamber 43A. That is, the primary-side passage section includes the pressure chamber 43A, which is a space formed between the valve member 13 and the valve seat 12.

The pressure reduction valve 1 configured as described above may have the following issues. For example, when a large amount of hydrogen gas abruptly flows in from the primary port 4 in a state in which the pressure reduction valve 1 is open, the pressure in the primary-side passage section of the gas passage 17, more specifically, the pressure in the pressure chamber 43A may increase abruptly. This increases the difference between the pressure in the primary-side passage section and the pressure in the secondary-side passage section, which may delay the closing action of the valve member 13. Such a delay in the closing action of the valve member 13 can cause the secondary pressure to exceed the value of the preset pressure.

Therefore, the present embodiment has the following configuration as the valve member 13.

Figure 3:
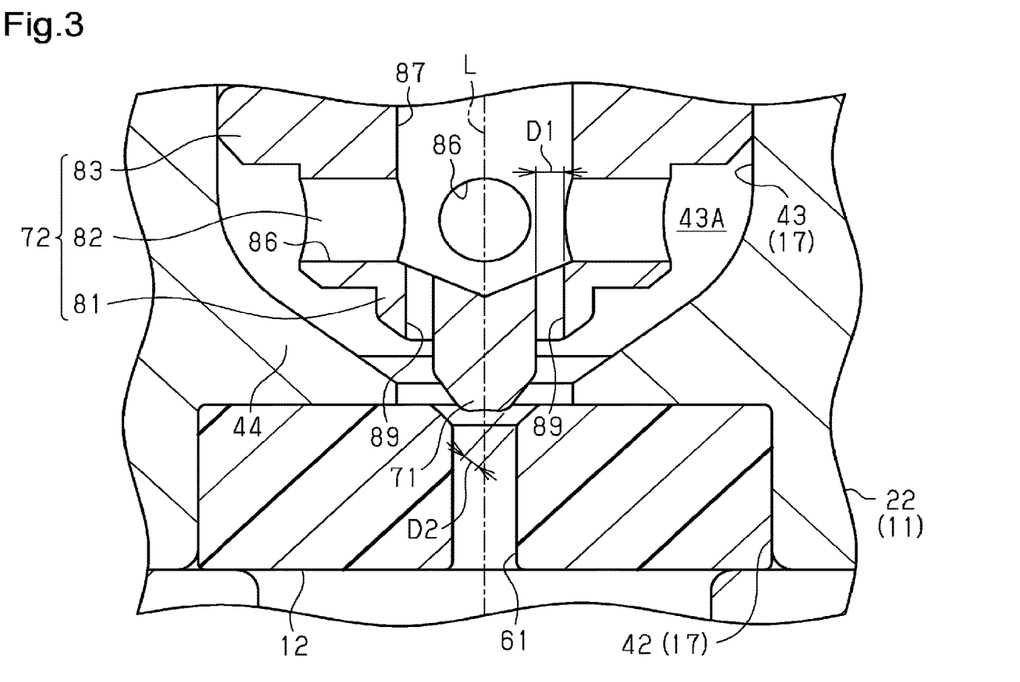
FIG. 3 is an enlarged cross-sectional view of the pressure reduction valve shown in FIG. 1, showing a part including the valve member and the valve seat.

As shown in FIG. 3, the valve member 13 includes multiple (for example, four) auxiliary passages 89. The auxiliary passages 89 are provided in the distal end portion 81 of the valve member 13 to surround the head 71. The auxiliary passages 89 are provided at equal intervals in the circumferential direction of the head 71. Each auxiliary passage 89 extends linearly along the axis L. Each auxiliary passage 89 connects the longitudinal hole 87 to the pressure chamber 43A on the upstream side of and at a position immediately below the longitudinal hole 87. In other words, each auxiliary passage 89 opens in the inner end face on the upstream side of the longitudinal hole 87. Each auxiliary passage 89 connects the pressure chamber 43A, which is the space between the distal end portion 81 and the partition wall 44, to the inside of the longitudinal hole 87, that is, an intermediate section of the valve member passage. An inner diameter D1, which is the size of the auxiliary passage 89, is set to be larger than a length D2 of the clearance between the valve seat 12 and the head 71 of the valve member 13 at the time when the pressure reduction valve 1 is in the fully open state, for example. The length D2 is the dimension of the clearance between the valve member 13 and the valve seat 12, that is, the distance between the valve member 13 and the valve seat 12.

The above-described configuration achieves the following operation and advantages.

(1-1) Since the valve member 13 includes the auxiliary passages 89, the hydrogen gas flowing into the pressure chamber 43A is assisted to flow out to the secondary-side passage section of the gas passage 17 via the auxiliary passages 89. This prevents the pressure in the pressure chamber 43A from being increasing abruptly even when a large amount of hydrogen gas is abruptly supplied to the pressure chamber 43A. Since this reduces the difference between the pressure on the primary side and the pressure on the secondary side with respect to the valve member 13, the valve member 13 performs the valve closing action at an appropriate point in time. The pressure on the secondary side is thus adjusted more appropriately.

Specifically, when the pressure reduction valve 1 is open, the hydrogen gas supplied from the primary port 4 flows into the accommodation hole 43, more specifically, into the pressure chamber 43A, through the clearance between the valve seat 12 and the head 71 of the valve member 13. Some of the hydrogen gas flowing into the accommodation hole 43 immediately and directly flows into the longitudinal hole 87 via the auxiliary passages 89. The remainder of the hydrogen gas flowing into the accommodation hole 43 flows into the longitudinal hole 87 through the transverse holes 86 while moving downstream in the clearance between the distal end portion 81 of the valve member 13 and the partition wall 44 while bypassing the distal end portion 81. Accordingly, some of the hydrogen gas supplied from the primary port 4, that is, the hydrogen gas flowing into the longitudinal hole 87 via the auxiliary passages 89, is supplied to the fuel cell 3 prior to the hydrogen gas flowing into the longitudinal hole 87 via the transverse holes 86. Thus, even if a large amount of hydrogen gas abruptly flows in from the primary port 4 in a state in which the pressure reduction valve 1 is open, the pressure in the pressure chamber 43A, which is part of the primary-side passage section, is prevented from increasing abruptly. In addition, since some of the hydrogen gas is quickly supplied to the fuel cell 3 via the auxiliary passages 89, the pressure in the secondary-side passage section also quickly starts increasing. This promptly reduces the difference between the pressure in the pressure chamber 43A, which is part of the primary-side passage section, and the pressure in the secondary-side passage section. As a result, the valve member 13 starts the valve closing action at an appropriate point in time when the pressure in the secondary-side passage section increases. The pressure in the secondary-side passage section is thus prevented from exceeding the preset pressure. Accordingly, the pressure reduction valve 1 adjusts the pressure of the hydrogen gas appropriately.

(1-2) The auxiliary passages 89 connect the pressure chamber 43A to an intermediate section of the longitudinal hole 87, which is the valve member passage. This configuration assists inflow of the gas from the pressure chamber 43A into the longitudinal hole 87. This promotes the outflow of the hydrogen gas from the pressure chamber 43A toward the secondary-side passage section of the gas passage 17.

Each auxiliary passage 89 may be provided to connect the pressure chamber 43A to an intermediate section of the transverse hole 86 (an intermediate section of the valve member passage). Even in this case, the inflow of hydrogen gas from the pressure chamber 43A to the transverse hole 86 and the longitudinal hole 87 is assisted. This promotes the outflow of the hydrogen gas from the pressure chamber 43A toward the secondary-side passage section of the gas passage 17.

Further, the first embodiment achieves the following advantages.

(1-3) Each auxiliary passage 89 extends along the axis L of the valve member 13 and connects the longitudinal hole 87 to the pressure chamber 43A at a position immediately below the longitudinal hole 87. This configuration assists the inflow of the hydrogen gas into the longitudinal hole 87. This promotes the outflow of the hydrogen gas from the pressure chamber 43A toward the secondary-side passage section of the gas passage 17.

(1-4) The inner diameter D1 of each auxiliary passage 89 is longer than the length D2 of the clearance between the valve seat 12 and the head 71 of the valve member 13 when the pressure reduction valve 1 is in the fully open state. This promotes outflow of a larger amount of hydrogen gas from the pressure chamber 43A toward the longitudinal hole 87 and further toward the secondary-side passage section of the gas passage 17.

Modification of First Embodiment

Next, a pressure reduction valve according to a modification of the first embodiment will be described. This modification has basically the same configuration as that of the first embodiment shown in FIGS. 1 to 3. For illustrative purposes, like or same reference numerals are given to those components that are like or the same as the corresponding components of the first embodiment and detailed explanations are omitted.

Figure 4:
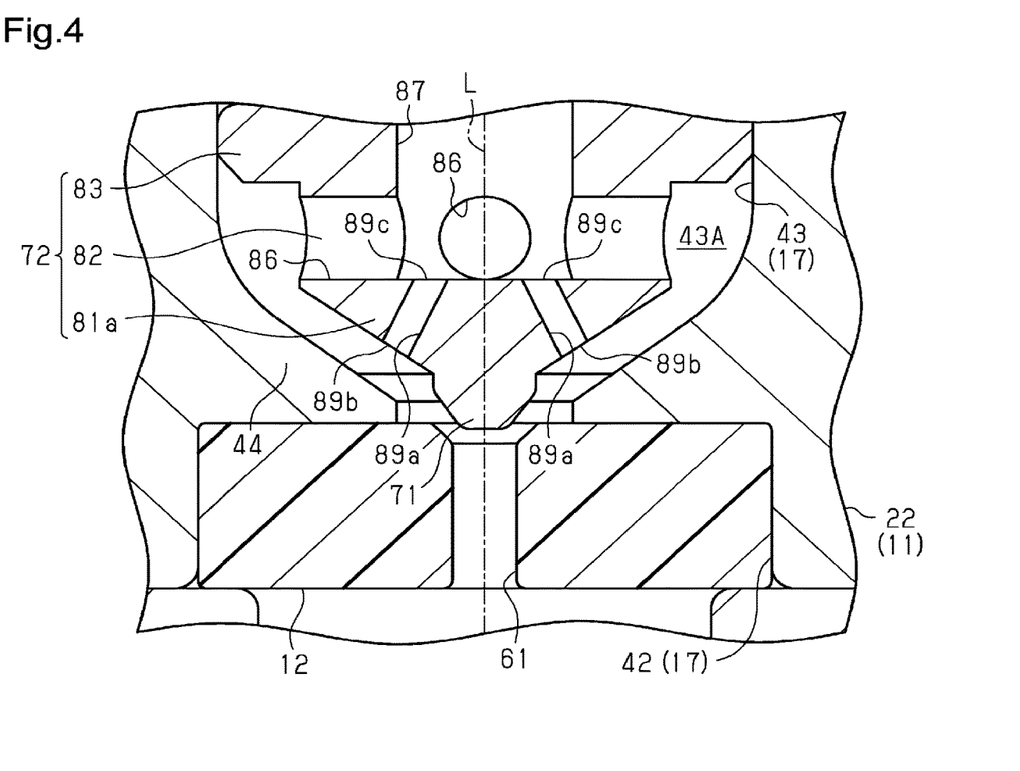
FIG. 4 is an enlarged cross-sectional view of a pressure reduction valve according to a modification of the first embodiment, showing a part including a valve member and a valve seat.

As shown in FIG. 4, a distal end portion 81a of the valve member 13 has a tapered shape as a whole. The distal end portion 81a is provided continuously on the downstream side of the head 71. In other words, the distal end portion 81a forms a tapered portion. The outer circumferential surface of the distal end portion 81a is inclined with respect to the axis L of the valve member 13 over the entire region in the axial direction of the distal end portion 81a. In other words, the outer circumferential surface of the distal end portion 81a does not include a plane orthogonal to the axis L of the valve member 13. As an example, the outer diameter of the outer circumferential surface of the distal end portion 81a linearly decreases from the downstream side toward the upstream side so that the outer circumferential surface of the distal end portion 81a forms a certain angle with respect to the axis L.

Each auxiliary passage 89a includes a first opening 89b in the outer circumferential surface of the distal end portion 81a and a second opening 89c in the inner end face of the longitudinal hole 87. Each auxiliary passage 89a extends linearly in a direction inclined with respect to the axis L of the valve member 13. Thus, each first opening 89b is provided at a position away from the head 71 toward the radially outer side. The inclination angles of the auxiliary passages 89a with respect to the axis L are the same. The inner diameter of the auxiliary passage 89a is equal to the inner diameter D1 of the auxiliary passage 89 of the first embodiment.

This configuration achieves the following operation and advantages in addition to the operation and advantages of the first embodiment.

(1-5) The valve member 13 includes the distal end portion 81a, which is provided continuously on the downstream side of the head 71. The outer circumferential surface of the distal end portion 81a is inclined with respect to the axis L of the valve member 13 over the entire region in the axial direction of the distal end portion 81a. That is, the outer circumferential surface of the distal end portion 81a does not include a plane orthogonal to the axis L of the valve member 13. Therefore, as compared to a case in which the distal end portion 81a includes a plane orthogonal to the axis L, it is possible to suppress the occurrence of an area in which the pressure is increased by the inflow of hydrogen gas, i.e., a so-called pressure accumulation, on the upstream side of the distal end portion 81a. Since this reduces the difference between the pressure in the primary-side passage section and the pressure in the secondary-side passage section of the gas passage 17, the valve member 13 performs the valve closing action at an appropriate point in time.

(1-6) Each auxiliary passage 89a includes the first opening 89b in the outer circumferential surface of the distal end portion 81a. The auxiliary passage 89a extends in a direction inclined with respect to the axis L of the valve member 13 so that the first opening 89b is away from the head 71. Since the first opening 89b is separated from the head 71 as described above, the head 71 is less likely to be damaged when the auxiliary passages 89a are formed, facilitating the machining of the valve member 13.

The tapered shape of the head 71 is inclined so as to correspond to the inclination of the downstream region of the valve hole 61. The outer circumferential surface of the head 71 thus comes into close contact with the inner circumferential surface of the valve hole 61. Accordingly, hydrogen gas is prevented from passing through the valve hole 61 when the pressure reduction valve 1 is closed. Therefore, it is important to machine the auxiliary passages 89a without damaging the head 71.

Second Embodiment

Next, a pressure reduction valve according to a second embodiment will be described. The present embodiment has basically the same configuration as that of the first embodiment shown in FIGS. 1 to 3. For illustrative purposes, like or same reference numerals are given to those components that are like or the same as the corresponding components of the first embodiment and detailed explanations are omitted.

Figure 5:
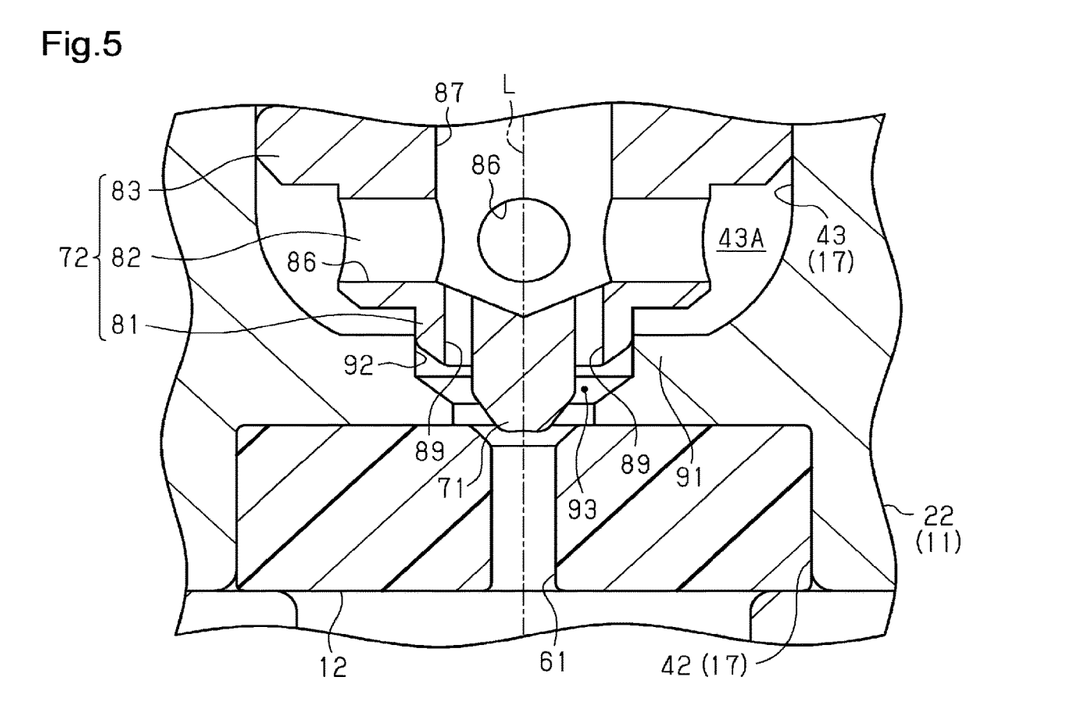
FIG. 5 is an enlarged cross-sectional view of a pressure reduction valve according to a second embodiment, showing a part including a valve member and a valve seat.

As shown in FIG. 5, the first housing member 22 includes a partition wall 91, which separates the accommodation hole 43 and the second attachment hole 42 from each other. The partition wall 91 is an annular flat plate orthogonal to the axis L. The partition wall 91 has a fitting hole 92. The fitting hole 92 connects the accommodation hole 43 and the second attachment hole 42 to each other. The fitting hole 92 is a two-stage hole having a large diameter portion and a small diameter portion. The large diameter portion of the fitting hole 92 is located on the side on which the accommodation hole 43 is provided, and the small diameter portion of the fitting hole 92 is located on the side on which the second attachment hole 42 is provided. The inner diameter of the large diameter portion of the fitting hole 92 is slightly larger than the outer diameter of the distal end portion 81 of the valve member 13. The distal end portion 81 of the valve member 13 is fitted into the large diameter portion of the fitting hole 92. The outer circumferential surface of the distal end portion 81 is slidable on the inner circumferential surface of the fitting hole 92.

The sizes of the distal end portion 81 and the fitting hole 92 are set such that the distal end portion 81 does not come off the fitting hole 92 even when the pressure reduction valve 1 is fully open. The circumferential edge of the fitting hole 92 in the partition wall 91 and the end on the upstream side of the middle portion 82 face each other in the direction along the axis L. The distance between the middle portion 82 and the partition wall 91 and the like are set such that the middle portion 82 does not contact the partition wall 91 until the head 71 is seated on the valve seat 12.

The fitting hole 92 includes an auxiliary chamber 93. The auxiliary chamber 93 is formed by partitioning the pressure chamber 43A by fitting the valve member 13 into the fitting hole 92, so that the auxiliary chamber 93 is separated from the rest of the pressure chamber 43A. The auxiliary chamber 93 is a space formed by being surrounded by the distal end portion 81 of the valve member 13, the inner circumferential surface of the fitting hole 92, and the valve seat 12. The auxiliary passages 89, which are provided in the distal end portion 81 of the valve member 13, open in the auxiliary chamber 93. That is, the auxiliary chamber 93 and the longitudinal hole 87 are connected to each other by the auxiliary passages 89.

This configuration achieves the following operation and advantages.

(2-1) Since the valve member 13 includes the auxiliary passages 89, the hydrogen gas flowing into the auxiliary chamber 93, which part of the pressure chamber 43A, is assisted to flow out to the secondary-side passage section of the gas passage 17 via the auxiliary passages 89. This prevents the pressure in the pressure chamber 43A from increasing abruptly even when a large amount of hydrogen gas is abruptly supplied to the pressure chamber 43A. Since this reduces the difference between the pressure on the primary side and the pressure on the secondary side with respect to the valve member 13, the valve member 13 performs the valve closing action at an appropriate point in time. The pressure on the secondary side is thus adjusted more appropriately.

Specifically, when the pressure reduction valve 1 is open, the hydrogen gas supplied from the primary port 4 first flows into the auxiliary chamber 93 through the clearance between the valve seat 12 and the head 71 of the valve member 13. Some of the hydrogen gas flowing into the auxiliary chamber 93 immediately and directly flows into the longitudinal hole 87 via the auxiliary passages 89. The remaining part of the hydrogen gas flowing into the longitudinal hole 87 from the auxiliary chamber 93 flows into the pressure chamber 43A through the transverse holes 86. Accordingly, some of the hydrogen gas supplied from the primary port 4, that is, the hydrogen gas flowing into the longitudinal hole 87 via the auxiliary passages 89 is supplied to the fuel cell 3 prior to the hydrogen gas flowing into the longitudinal hole 87 via the transverse holes 86. Thus, even if a large amount of hydrogen gas abruptly flows in from the primary port 4 in a state in which the pressure reduction valve 1 is open, the pressure in the pressure chamber 43A, which is part of the primary-side passage section, is prevented from increasing abruptly. In addition, since some of the hydrogen gas is quickly supplied to the fuel cell 3 via the auxiliary passages 89, the pressure in the secondary-side passage section also quickly starts increasing. This promptly reduces the difference between the pressure in the pressure chamber 43A and the pressure in the secondary-side passage section. As a result, the valve member 13 starts the valve closing action at an appropriate point in time when the pressure in the secondary-side passage section increases. The pressure in the secondary-side passage section is thus prevented from exceeding the preset pressure. Accordingly, the pressure reduction valve 1 adjusts the pressure of the hydrogen gas appropriately.

Further, the second embodiment achieves the following advantages.

(2-2) When the valve member 13 attempts to move further toward the valve seat 12 in a fully closed state, in which the valve member 13 is firmly seated on the valve seat, the end on the upstream side of the middle portion 82 comes into contact with the circumferential edge of the fitting hole 92 in the partition wall 91. Since further movement of the valve member 13 toward the upstream side is restricted, excessive deformation of the valve seat 12 is prevented.

Third Embodiment

Next, a pressure reduction valve according to a third embodiment will be described. The present embodiment has basically the same configuration as that of the second embodiment shown in FIG. 5. For illustrative purposes, like or same reference numerals are given to those components that are like or the same as the corresponding components of the second embodiment and detailed explanations are omitted.

Figure 6:
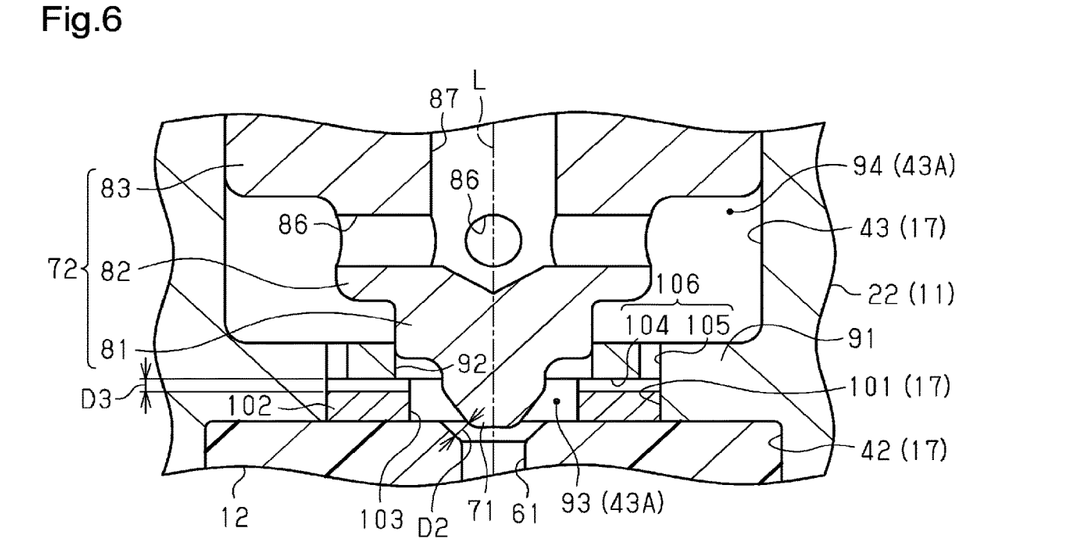
FIG. 6 is an enlarged cross-sectional view of a pressure reduction valve according to a third embodiment, showing a part including a valve member and a valve seat.

As shown in FIG. 6, the partition wall 91 includes a third attachment hole 101, which is part of the gas passage 17. The third attachment hole 101 may be provided as part of the fitting hole 92, for example. The third attachment hole 101 is formed by increasing the diameter of a portion of the fitting hole 92 on the side on which the second attachment hole 42 is provided, that is, on the upstream side. The third attachment hole 101 is a circular hole. The third attachment hole 101 is located on the axis L. The inner diameter of the third attachment hole 101 is smaller than the inner diameter of the second attachment hole 42 and larger than the inner diameter of the fitting hole 92.

A stopper 102 is attached to the third attachment hole 101. The stopper 102 may be, for example, a washer. The entire end face on the upstream side of the stopper 102 is in contact with the valve seat 12. The stopper 102 is made of metal or plastic. The stopper 102 has an annular shape. The stopper 102 has a through-hole 103 linearly extending along the axis L. The through-hole 103 opens on two side surfaces of the stopper 102 that are located on opposite sides in the direction along the axis L. The inner diameter of the through-hole 103 is larger than the outer diameter of the head 71 of the valve member 13 and smaller than the outer diameter of the distal end portion 81 of the valve member 13.

The distance between the end face on the upstream side of the distal end portion 81 and the stopper 102 and the like are set such that the end face on the upstream side of the distal end portion 81 comes into contact with the stopper 102 at the point in time when the head 71 of the valve member 13 is seated on the valve seat 12. Also, in the present embodiment, a space formed by being surrounded by the distal end portion 81 of the valve member 13, the inner circumferential surface of the fitting hole 92, the inner circumferential surface of the stopper 102, and the valve seat 12 functions as the auxiliary chamber 93. The portion of the pressure chamber 43A other than the auxiliary chamber 93 may be referred to as a main chamber 94.

The stopper 102 includes grooves 104. The grooves 104 are provided in the surface on the downstream side of the stopper 102. The grooves 104 extend in the radial direction of the stopper 102 and are provided over the entire length from the inner periphery to the outer periphery of the stopper 102. The grooves 104 are provided at equal angular intervals in the circumferential direction of the stopper 102. The depth D3 of the grooves 104 is set to be shorter than the length D2. That is, the flow passage area of each groove 104 is set to a value smaller than the flow passage area of the clearance between the valve seat 12 and the valve member 13.

The partition wall 91 includes pores 105. The pores 105 are provided in the same number as the grooves 104. The pores 105 extends along the axis L. The pores 105 connect the main chamber 94 of the pressure chamber 43A and the third attachment hole 101 to each other. The inner diameter of each pore 105 may be about the same as the depth D3 of the grooves 104. The pores 105 are provided at equal angular intervals in the circumferential direction of the fitting hole 92 to correspond to the grooves 104 of the stopper 102. The stopper 102 is attached to the third attachment hole 101 so that the grooves 104 correspond to the pores 105. The grooves 104 and the pores 105 are maintained to be connected to each other. The grooves 104 and the pores 105 form constriction passages 106, which are relatively narrow gas passages. Accordingly, the main chamber 94 and the auxiliary chamber 93 in the pressure chamber 43A are connected to each other by the constriction passages 106. The dimension of each constriction passage 106 is set to be shorter than the length D2.

Each constriction passage 106 may include a section having a dimension that is set to a value smaller than the dimension of the clearance between the valve seat 12 and the valve member 13 when the pressure reduction valve 1 is in the fully open state. That is, the dimension at least one of each groove 104 and each pore 105 may be set to a value smaller than the length D2.

Further, the stopper 102 does not necessarily need to be provided as a separate member. For example, a portion corresponding to the stopper 102 may be formed integrally with the first housing member 22. In this case, from the viewpoint of machinability, the grooves 104 may be replaced by inclined holes that function as the constriction passage 106 to connect the main chamber 94 and the auxiliary chamber 93 in the pressure chamber 43A.

The partition wall 91, which includes the fitting hole 92, and the constriction passages 106 form a constriction configured to reduce the flow rate of the hydrogen gas flowing into the main chamber 94 of the pressure chamber 43A through the clearance between the valve seat 12 and the valve member 13.

This configuration achieves the following operation and advantages.

(3-1) The pressure reduction valve 1 includes the constriction passages 106, which serve as a constriction. With this configuration, the flow rate of the hydrogen-gas flowing into the main chamber 94 of the pressure chamber 43A is reduced by the constriction passages 106. Therefore, even when a large amount of hydrogen gas is abruptly supplied to the pressure chamber 43A, the pressure in the main chamber 94 is prevented from being increased abruptly. Since this reduces the difference between the pressure on the primary side and the pressure on the secondary side with respect to the valve member 13, the valve member 13 performs the valve closing action at an appropriate point in time. The pressure on the secondary side is thus adjusted more appropriately.

Specifically, when the pressure reduction valve 1 is open, the hydrogen gas supplied from the primary port 4 first flows into the auxiliary chamber 93 through the clearance between the valve seat 12 and the head 71 of the valve member 13. The hydrogen gas flowing into the auxiliary chamber 93 flows into the main chamber 94 through the multiple constriction passages 106. However, when the hydrogen gas passes through the constriction passages 106, the pressure is further reduced in accordance with the flow passage area of each constriction passage 106. That is, the flow rate of the hydrogen gas flowing into the auxiliary chamber 93 is reduced by passing through the constriction passages 106 before the hydrogen gas is supplied to the main chamber 94. Therefore, even when a large amount of hydrogen gas abruptly flows in from the primary port 4 in a state in which the pressure reduction valve 1 is open, an abrupt increase in the pressure in the main chamber 94 is prevented. In addition, since the rate of pressure increase in the main chamber 94 is reduced to a more gradual rate, the pressure in the secondary-side passage section of the gas passage 17 also increases gradually. This reduces the difference between the pressure in the primary-side passage section and the pressure in the secondary-side passage section. As a result, the valve member 13 starts the valve closing action at an appropriate point in time when the pressure in the secondary-side passage section increases. Therefore, the pressure in the secondary-side passage section is also prevented from exceeding the preset pressure. Accordingly, the pressure reduction valve 1 adjusts the pressure of the hydrogen gas appropriately. In addition, since the rate of pressure increase in the main chamber 94 is reduced, the valve member 13 performs the valve closing action and the valve opening action more smoothly.

Further, the third embodiment achieves the following advantages.

(3-2) The dimension of each constriction passage 106 has a portion shorter than the length D2. Therefore, the flow rate of the hydrogen gas flowing from the auxiliary chamber 93 into the main chamber 94 is reduced in a desirable manner.

(3-3) When the valve member 13 attempts to move further toward the valve seat 12 in a state of being seated on the valve seat 12, the end on the upstream side of the distal end portion 81 comes into contact with the stopper 102. Since further movement of the valve member 13 toward the upstream side is restricted, excessive deformation of the valve seat 12 is prevented.

Fourth Embodiment

Next, a pressure reduction valve according to a fourth embodiment will be described. The present embodiment has basically the same configuration as that of the second embodiment shown in FIG. 5. For illustrative purposes, like or same reference numerals are given to those components that are like or the same as the corresponding components of the second embodiment and detailed explanations are omitted.

Figure 7:
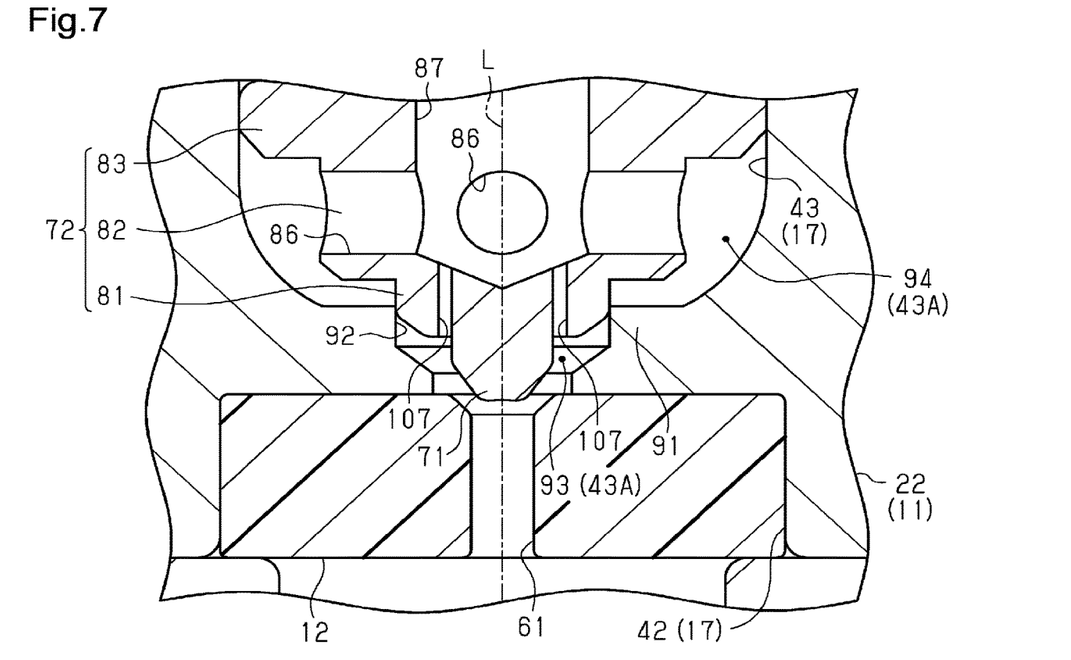
FIG. 7 is an enlarged cross-sectional view of a pressure reduction valve according to a fourth embodiment, showing a part including a valve member and a valve seat.

As shown in FIG. 7, the valve member 13 includes multiple (for example, four) constriction passages 107. The constriction passages 107 are configured in the same manner as the auxiliary passages 89 of the second embodiment, except that the inner diameters thereof are different. The constriction passages 107 connect the auxiliary chamber 93 and the longitudinal hole 87 to each other. The inner diameter of each constriction passage 107 is set to be shorter than the length D2.

The partition wall 91, which includes the fitting hole 92, and the constriction passages 107, which are formed in the valve member 13, form a constriction configured to reduce the flow rate of the hydrogen gas flowing into the main chamber 94 of the pressure chamber 43A through the clearance between the valve seat 12 and the valve member 13.

This configuration achieves the following operation and advantages.

(4-1) The pressure reduction valve 1 includes the constriction passages 107, which serve as a constriction. With this configuration, the flow rate of the hydrogen-gas flowing into the main chamber 94 of the pressure chamber 43A is reduced by the constriction passages 107. This prevents the pressure in the pressure chamber 43A from increasing abruptly even when a large amount of hydrogen gas is abruptly supplied to the pressure chamber 43A. Since this reduces the difference between the pressure on the primary side and the pressure on the secondary side with respect to the valve member 13, the valve member 13 performs the valve closing action at an appropriate point in time. The pressure on the secondary side is thus adjusted more appropriately.

Specifically, when the pressure reduction valve 1 is open, the hydrogen gas supplied from the primary port 4 first flows into the auxiliary chamber 93 through the clearance between the valve seat 12 and the head 71 of the valve member 13. The hydrogen gas flowing into the auxiliary chamber 93 flows into the main chamber 94 of the pressure chamber 43A through the multiple constriction passages 107 and the transverse holes 86. However, when the hydrogen gas passes through the constriction passages 107, the pressure is further reduced in accordance with the flow passage area of each constriction passage 107. That is, the flow rate of the hydrogen gas flowing into the auxiliary chamber 93 is reduced by passing through the constriction passages 107 before the hydrogen gas is supplied to the main chamber 94. Therefore, even when a large amount of hydrogen gas abruptly flows in from the primary port 4 in a state in which the pressure reduction valve 1 is open, an abrupt increase in the pressure in the main chamber 94 is prevented. In addition, since the rate of pressure increase in the main chamber 94 is reduced to a more gradual rate, the pressure in the secondary-side passage section also increases gradually. This reduces the difference between the pressure in the primary-side passage section and the pressure in the secondary-side passage section. As a result, the valve member 13 starts the valve closing action at an appropriate point in time when the pressure in the secondary-side passage section increases. Therefore, the pressure in the secondary-side passage section is also prevented from exceeding the preset pressure. Accordingly, the pressure reduction valve 1 adjusts the pressure of the hydrogen gas appropriately. In addition, since the rate of pressure increase in the main chamber 94 is reduced, the valve member 13 performs the valve closing action and the valve opening action more smoothly.

Other Embodiments

The first to fourth embodiments may be modified as follows.

Figure 8:
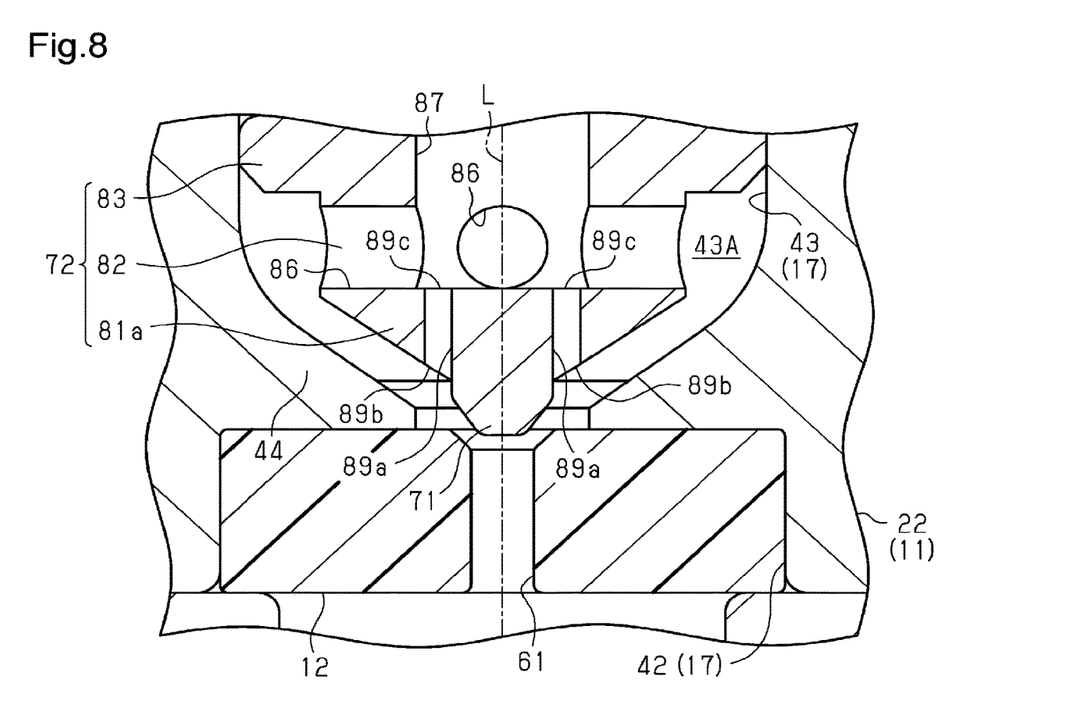
FIG. 8 is an enlarged cross-sectional view of a pressure reduction valve according to another embodiment, showing a part including a valve member and a valve seat.

In the modification of the first embodiment, the shape and the like of the auxiliary passages 89a may be changed. For example, the second opening 89c may be located in the inner circumferential surface of the transverse hole 86 instead of the end face of the longitudinal hole 87. Further, as shown in FIG. 8, each auxiliary passage 89a may extend linearly along the axis L of the valve member 13. In this example, the first opening 89b is located at a position adjacent to the head 71 in the radial direction.

In the modification of the first embodiment, the outer diameter of the outer circumferential surface of the distal end portion 81a linearly decreases from the downstream side toward the upstream side so that the outer circumferential surface of the distal end portion 81a forms a certain angle with respect to the axis L. However, the present disclosure is not limited to this. For example, the outer diameter of the outer circumferential surface of the distal end portion 81a may nonlinearly decrease from the downstream side toward the upstream side so that the angle of the outer circumferential surface of the distal end portion 81a in relation to the axis L decreases gradually.

In each of the embodiments, a compression coil spring is employed as the urging member 14, but the urging member 14 is not limited to this. Another elastic member such as a disc spring may be employed.

In each of the embodiments, the pressure reduction valve 1 is used for reducing the pressure of high-pressure hydrogen gas, but it may also be used for reducing the pressure of high-pressure gases other than hydrogen.

The invention claimed is:

1. A pressure reduction valve, comprising: a body including a gas passage; a valve seat provided in the gas passage; a valve member provided on a downstream side of the valve seat in the gas passage, wherein the gas passage includes: a primary-side passage section located on an upstream side of the valve member; and a secondary-side passage section located on a downstream side of the valve member, the primary-side passage section includes a pressure chamber, the pressure chamber being a space formed between the valve member and the valve seat, the valve member is configured to be constantly urged in a direction away from the valve seat and to open and close the valve seat in accordance with a difference between a pressure in the primary-side passage section and a pressure in the secondary-side passage section, the valve member further includes: a valve member passage that opens in an outer circumferential surface of the valve member and connects the pressure chamber to the secondary-side passage section, and an auxiliary passage that opens in the outer circumferential surface of the valve member and is configured to increase an amount of gas that flows into the pressure chamber through a clearance between the valve member and the valve seat to flow out to the secondary-side passage section compared to a valve member without an auxiliary passage, the valve member passage and the auxiliary passage open independently from each other in the outer circumferential surface of the valve member, and a first opening of the auxiliary passage is positioned in the outer circumferential surface of the valve member, the first opening of the auxiliary passage being upstream with respect to a first opening of the valve member passage along a direction in which the gas flows.

2. The pressure reduction valve according to claim 1, wherein the pressure chamber is in fluid communication with an intermediate section of the valve member passage via the auxiliary passage, the intermediate section of the valve member passage being disposed between the first opening of the valve member passage and a second opening of the valve member passage.

3. The pressure reduction valve according to claim 1, wherein
the valve member includes:
a head configured to abut the valve seat; and a tapered portion provided continuously on a downstream side of the head along the direction in which the gas flows, and an outer circumferential surface of the tapered portion is inclined with respect to an axis of the valve member over an entire region in an axial direction of the tapered portion.

4. The pressure reduction valve according to claim 3, wherein the first opening of the auxiliary passage is positioned in the outer circumferential surface of the tapered portion, and the auxiliary passage extends in a direction inclined with respect to the axis of the valve member such that the first opening of the auxiliary passage separates away from the head.

5. The pressure reduction valve according to claim 2, wherein the valve member passage includes: a transverse hole that extends in a direction intersecting with an axis of the valve member, the transverse hole opening in the pressure chamber; and a longitudinal hole that extends along the axis of the valve member and connects the transverse hole to the secondary-side passage section, and the auxiliary passage extends along the axis of the valve member and connects the longitudinal hole to the pressure chamber at a position immediately below the longitudinal hole.

6. The pressure reduction valve according to claim 1, wherein a dimension of the auxiliary passage is set to a value greater than a dimension of the clearance between the valve member and the valve seat at a time when the valve member is in a fully open state in relation to the valve seat.

* * * * *